(12) United States Patent
Jacquemot et al.

(10) Patent No.: US 10,057,307 B2
(45) Date of Patent: Aug. 21, 2018

(54) DISTRIBUTED PROGRAMMABLE CONNECTION METHOD TO ESTABLISH PEER-TO-PEER MULTIMEDIA INTERACTIONS

(71) Applicant: TWINLIFE SAS, Chatenay-Malabry (FR)

(72) Inventors: Christian Jacquemot, Saint-Germain-les-Corbeil (FR); Michel Gien, Feucherolles (FR)

(73) Assignee: TWINLIFE SAS, Chatenay-Malabry (FR)

( * ) Notice: Subject to any disclaimer, the term of this patent is extended or adjusted under 35 U.S.C. 154(b) by 219 days.

(21) Appl. No.: 14/904,604

(22) PCT Filed: Jul. 10, 2014

(86) PCT No.: PCT/EP2014/064844
§ 371 (c)(1),
(2) Date: Jan. 12, 2016

(87) PCT Pub. No.: WO2015/004250
PCT Pub. Date: Jan. 15, 2015

(65) Prior Publication Data
US 2016/0149970 A1    May 26, 2016

(30) Foreign Application Priority Data
Jul. 12, 2013 (EP) .................................. 13290166

(51) Int. Cl.
*G06F 15/16* (2006.01)
*H04L 29/06* (2006.01)
*H04W 4/00* (2018.01)
*H04L 29/08* (2006.01)
*H04W 4/70* (2018.01)
*H04W 4/80* (2018.01)

(52) U.S. Cl.
CPC .......... *H04L 65/403* (2013.01); *H04L 65/608* (2013.01); *H04L 67/104* (2013.01); *H04W 4/00* (2013.01); *H04W 4/70* (2018.02); *H04W 4/80* (2018.02)

(58) Field of Classification Search
CPC ...... H04L 67/104; H04L 51/04; H04L 63/061
USPC ........................................................ 709/204
See application file for complete search history.

(56) References Cited

U.S. PATENT DOCUMENTS

2003/0055894 A1*   3/2003  Yeager .................... G06F 9/544
                                                        709/204
2012/0311686 A1   12/2012  Medina et al.
(Continued)

*Primary Examiner* — Wing F Chan
*Assistant Examiner* — Andrew Woo
(74) *Attorney, Agent, or Firm* — Budzyn IP Law LLC

(57) ABSTRACT

The present invention proposes a technique for establishing peer-to-peer multimedia interactions and data exchanges via a discovery mechanism which relies on a model of (chained) programmable switchboards which may be implemented to enable a step-by-step discovery process until the endpoint of the communication chain is actually reached. The novelty of the proposed system and distinct contrast to known systems is that each endpoint can actually program if, how and when it wants to be reached for each individual user initiating contact, and to provide the information on how to be reached to its potential users initiating contact along its own model.

9 Claims, 10 Drawing Sheets

(56) References Cited

U.S. PATENT DOCUMENTS

2012/0324589 A1 12/2012 Nukala et al.
2014/0006506 A1* 1/2014 Frei .................... H04L 29/1249
                                                              709/204

* cited by examiner

US 10,057,307 B2

DISTRIBUTED PROGRAMMABLE CONNECTION METHOD TO ESTABLISH PEER-TO-PEER MULTIMEDIA INTERACTIONS

CROSS-REFERENCE TO RELATED APPLICATION

This application is a National Stage application under 35 U.S.C. § 371 of PCT Application No. PCT/EP2014/64844, filed, Jul. 10, 2014, which is incorporated by reference herein.

TECHNICAL FIELD

The present invention generally relates to the field of multimedia peer-to-peer communication. More specifically, the invention relates to a technique of identifying users and routing calls between users.

BACKGROUND

Voice over internet protocol (VoIP) communication systems allow the user of a device, such as a personal computer (e.g. desktop, laptop or tablet PC) or a smartphone, to make calls across a computer network such as the Internet. These systems are beneficial to the user as they are often of much lower cost than fixed line or mobile networks and, in addition to audio streams, can also provide video and data streams.

However, known VoIP systems such as Skype or FaceTime can only establish connections between "subscribers" registered in the service provider database (typically with a telephone number or a user ID). Thus, in order to call another user, one user needs to be registered into a service provider database and may only connect to another user that is also registered in a service provider database. Gateways or bridges can interconnect these databases and/or translate the communication protocols between service providers, but each service provider works along the same model, in which the communication services and protocols and the naming model are tightly coupled within a single communication infrastructure and subscribers database, under the control of a given service provider.

Under such a constrained model, it is not possible for a user to communicate anonymously, i.e. without being a subscriber of a particular service provider. Moreover, a user cannot communicate with someone not registered with a particular service provider, and for which the subscriber ID within this service provider is not known in advance. In other words, according to current models, all links are quasi static i.e. the caller subscriber is linked to a caller subscriber ID which is in turn linked to a specific service provider communication infrastructure which is further linked to a callee subscriber ID that is linked to the callee.

Another drawback in such systems is that the same subscriber ID (or a small number thereof) needs to be used to communicate with a user on a given service provider network.

Other known multimedia communication systems offered via the Internet such as "click to chat" allow a website user to communicate with a service agent without being previously registered within a communication service provider database. However, such services are only available from a web browser, and are only designed to communicate with a service agent of a given website, or other users of that same website. Moreover, such communications are usually limited to text communication, or file sharing.

Web Real-Time Communication (WebRTC) is an Application Programming Interface (API) definition being drafted by the World Wide Web Consortium (W3C) which enables browser-to-browser applications for voice calling, video chat and data transfer without plugins.

STATEMENT OF INVENTION

The present invention is defined by the features of the independent claims. Further beneficial preferred embodiments thereof are defined by the features of the dependent claims.

In general, the present invention effectively proposes a technique for establishing peer-to-peer multimedia interactions and data exchanges via a discovery mechanism which relies on a model of (chained) programmable switchboards which may be implemented to enable a step-by-step discovery process until the endpoint of the communication chain is actually reached. The novelty of the proposed system and distinct contrast to known systems is that each endpoint can actually program if, how and when it wants to be reached for each individual user initiating contact, and to provide the information on how to be reached to its potential users initiating contact along its own model.

In a first aspect, the present invention provides a method, system and computer-implemented medium with instructions for establishing a peer-to-peer communication link over a data communications network. According to the invention a token comprising an identifier, preferably in the form of an embedded globally unique identifier, associated with at least one first user (the contact recipient(s) of the communication link to be established) is generated. The token comprises instructions which, when executed, determine how the communication link is established. The token is then distributed to at least one second computing device associated with at least one second user (the contact initiator of the communication link to be established). The token is imported into a software application installed on the second computing device and subsequently activated in order to cause the instructions to be executed by the second computing device. Upon the instructions being activated by the second computing device a communication link is established to a first computing device associated with the first user, whereby the first and second users are enabled to communicate with one another via the established communication link. According to the present invention, the token is programmed with intelligence and the link is eventually established using an asymmetrical procedure i.e. the contact recipient generates the means by which the contact initiator can connect to them before the initiator establishes the connection, in the context of the present invention, the "users" are not limited to being human. As is understood in the art, such users could also be intelligent hardware/software agents in a machine-to-machine system or the like.

The present invention thereby provides a method and system wherein an administration means (subsequently referred to as a Service Connector Administrator) manages and operates a plurality of distributed intelligent software agents which allow a contact initiator user to establish peer-to-peer multimedia interactions with other contact recipient users. The method of the present invention advantageously allows such interactions without the need for a single unified service provider or subscriber database. The invention further obviates the need for any central data management and ensures a user call may be more efficiently routed to another user.

The means for the contact initiator user to connect to another user as contact recipient (subsequently also referred to as Client Connector Agents) are distributed to the contact initiator users as "Handles" or "Tokens" via unspecified known means such as e-mail, SMS, QR-codes, RFIDs, location information, to name but a few examples. The terms Handle and Token are considered synonymous in the context of the present invention and may be used interchangeably. Unlike known systems, the ability to distribute Client (and Service) Connector Agent Handles by different unspecified means greatly improves flexibility and reduces the cognitive burden of both contact initiator and recipient users when wanting to establish a communication link for peer-to-peer interaction with other users.

In a preferred embodiment of the invention, the instructions of the token determine how the communication link is routed. The intelligence programmed into the token ensures correct and/or efficient routing without the need for a central subscriber database.

According to an exemplary implementation of the invention, upon activating a token, Client Connector Agents are installed within a particular generic mobile application or a particular generic web application (subsequently referred to as Service Proxy Button Containers) already installed on a computing device, for example, as a button such as a "click to call & see" button. This provides a simple means for establishing a multimedia communication link with another contact recipient user.

In an exemplary implementation, contact initiator users activate a given "click to call & see" button in a (HTML5 enabled) web browser or in a mobile application to establish peer-to-peer interactions with an unspecified user or users, for example, an anonymous service agent.

In another aspect of the invention, the Client Connector Agents can perform specific actions specified by the Service Connector Administrator on a per user basis, before initiating the connection, during the connection, or at the connection termination. In other words, it is possible for the Service Connector Administrator to introduce as much or as little intelligence needed to the Client Connector Agents, thereby "tailoring" properties to each client based on their needs. In both aspects, this ensures increased efficiency and flexibility in multimedia peer-to-peer communication between Client and Service Agents.

Similarly, in a further aspect of the invention, the endpoint of a connection from a contact initiator i.e. on the contact recipient user side can also perform specific actions specified by the Service Connector Administrator on a per user basis, prior to establishing an actual connection with the contact recipient user, during the connection or at the connection termination.

In a further aspect, the Service Connector Administrator is able to dynamically change all elements on the connection path between contact initiator users and contact recipient users e.g. Clients and Service Agents. Such elements that may be changed include, but are not limited to the maximum number of Service Agents, the role of the Service Agents, the function of switchboards brokering the connection between the agents, the Client Agent lifetime, peer to peer properties, audio, video, data channel, dependent on the situation. This approach further enables the tailoring of properties to improve efficiency and flexibility in multimedia peer-to-peer communication between individual users such as Client and Service Agents.

The instructions may preferably be reprogrammed dynamically before establishing the communication link and/or during communication via the communication link and/or once the communication link is terminated. The intelligence programmed into the token can thereby be reprogrammed to suit a number of factors specific to the particular communication link between the given users. As discussed above, this effectively enables the token to be tailored to the specific communication link between the users, thereby ensuring greater efficiency in establishing, maintaining, and securing the communication link.

Furthermore, in another preferred embodiment of the invention, the instructions programmed into the token can cause the association between the first computing device and the first user to be changed dynamically before establishing the communication link and/or during the communication via the communication link. The intelligence programmed into the token can, for example, cause an association to change to at least one different user a number of factors specific to the particular communication link between the given users e.g. enabling the link to be seamlessly transferred from the original user to a different user (e.g. if a contact recipient user i.e. service agent is no longer obliged to receive communications from a contact initiator user i.e. client, or if the contact recipient user receives a more important request to communicate from another user). Further such examples might include that a communication link receives a different level of priority dependent on the number of activation times of the token e.g. a service agent's availability becomes more limited each time a communication link is established. A client user could also be connected with different service agent users with varying levels of experience depending on a system of weighting based on e.g. reputation of the client user. Such instructions may be reprogrammed dynamically.

In a further preferred embodiment of the invention, the instructions are reprogrammed by the software application based on local data available to the software application. The instructions of the token and how it establishes and routes a communication link can thereby change depending on local data provided by, for example, the device upon which the software application is installed upon. This enables the token to be reprogrammed based on the context of a user. The local data available to the software application preferably comprises at least one of: data specific to the second computing device and data associated with the location of the second computing device. The instructions of the token can thereby be reprogrammed and changed according to and depending on the type or location/environment of the device upon which the software application is installed. This advantageously further improves efficient establishment and routing of a communication link.

In yet another preferred embodiment of the invention, the instructions cause the communication link to be established differently dependent on the method of distribution of the token. For example, a token received by SMS may cause a different action to occur when activated and upon establishing a communication link than in comparison to one received by different means, such as a QR-code. This further improves flexibility in establishment of the communication link and ensures more useful, i.e. more accurately routed, communication between a contact initiator and contact recipient.

According to a further preferred embodiment of the invention, the instructions of the token cause the possibility of establishing a communication link between the second and first users to be limited. The instructions may cause a token to only be valid for a certain set of circumstances. Examples of such circumstances are the token only being valid for: establishing a single communication link, a number of times a communication link is established, set times at which the link can be established, or any other life cycle constraints. The token can thereby be advantageously further tailored to a given communication link or non-infinite number of communication links.

In a further embodiment, establishing the communication link between the first and second computing devices comprises establishing the communication link via at least one programmable agent referred to below as a "Broker Agent", wherein the programmable agent comprises further instructions which determine how the communication link is routed. The broker agent(s) can also include intelligence based on various data collected with respect to all the communication links being established via the given agent, for example, call statistics, traffic information, resource availability, firewalls, etc.

The further instructions referred to above are preferably reprogrammed by the instructions of the token. The intelligence included in the broker agent(s) can also be reprogrammed based on the intelligence programmed in a token. In other words, a token is able to distribute its intelligence to other agents to ensure, for example, most efficient or appropriate routing.

In another preferred embodiment of the invention, the authentication of the second user (contact initiator) is required by the first user (contact recipient) and enforced by authentication means. The authentication means could be instructions programmed into the token which require entry of a correct password before the token may be activated. The authentication means could also be implemented through requiring entry of relevant details of an existing account with a subscriber service (e.g. Facebook, Google+ etc.) in order to enable activation of the token. The invention thereby enables authentication of the second user (contact initiator) as the genuine authorized recipient of the particular token associated with the first user (contact recipient) and distributed to the second user (contact initiator), i.e. only the contact initiator for which the token was intended may activate the token to establish a communication link to the contact recipient who generated it.

In a further preferred embodiment of the invention, the present invention proposes a system to take advantage of the architecture provided by peer-to-peer communication protocols (such as WebRTC) in which the actual (multimedia) communication protocol is handled by the endpoints themselves. The communication link is preferably established using at least one communication protocol including the WebRTC protocol. The invention thereby advantageously enables the users at the endpoints to discover one another without relying on any particular mechanism and obviates the need for a service provider subscriber database. The invention thus provides a very flexible way to allow the users at the endpoints to discover one another and to operate the mechanisms necessary for a peer to peer protocol (such as WebRTC) to be operated between the users at the endpoints. Furthermore, the token can help define which protocol(s) best suit the particular communication link to be established and is particularly suited to using WebRTC. The established communication connection is also preferably a multimedia communication link, in particular a video call.

In another preferred embodiment of the invention, one of the computing devices is a mobile device and the other computing device is a personal computer. This enables facilitated establishment of a communication link compris-ing, for example, voice calling, video chat and data transfer between a native application on a mobile device such as a smart phone and a browser application installed on a desktop computer or any other device. The invention thereby provides seamless compatibility between mobile applications to other computing devices with an appropriate protocol e.g. WebRTC installed in the browser application. This advantageously increases the flexibility of communication links between peers connected via a network such as the Internet and thereby creates opportunities for new usage models not permitted by known subscriber-based systems.

DETAILED DESCRIPTION

The following terminology is used to describe the individual key elements of the present invention. The skilled person will recognize that all these elements may be implemented in software, or in combination with hardware. In any of these implementations, there are many other architectures and topologies that are not illustrated and it will be understood that all the individual elements described may also be implemented in many different constellations which still fall within the scope of the claims.

The term "Agent" is to be understood in the context of a "software agent" i.e. a computer program that provides basic functional entities and acts on behalf of a user or other program. In particular, the "Agents" in the context of the present invention are all, when in operation, intended to have the authority to decide which action is appropriate. Agents with such a level of autonomy may also be commonly known as, for example, "intelligent agents", "autonomous agents" and "multi-agent systems".

The term "Container" is to be understood as providing the basic functions in a processing and communication infrastructure and storage for agents. One or more agent containers can run within a single platform or application.

Figure 1:
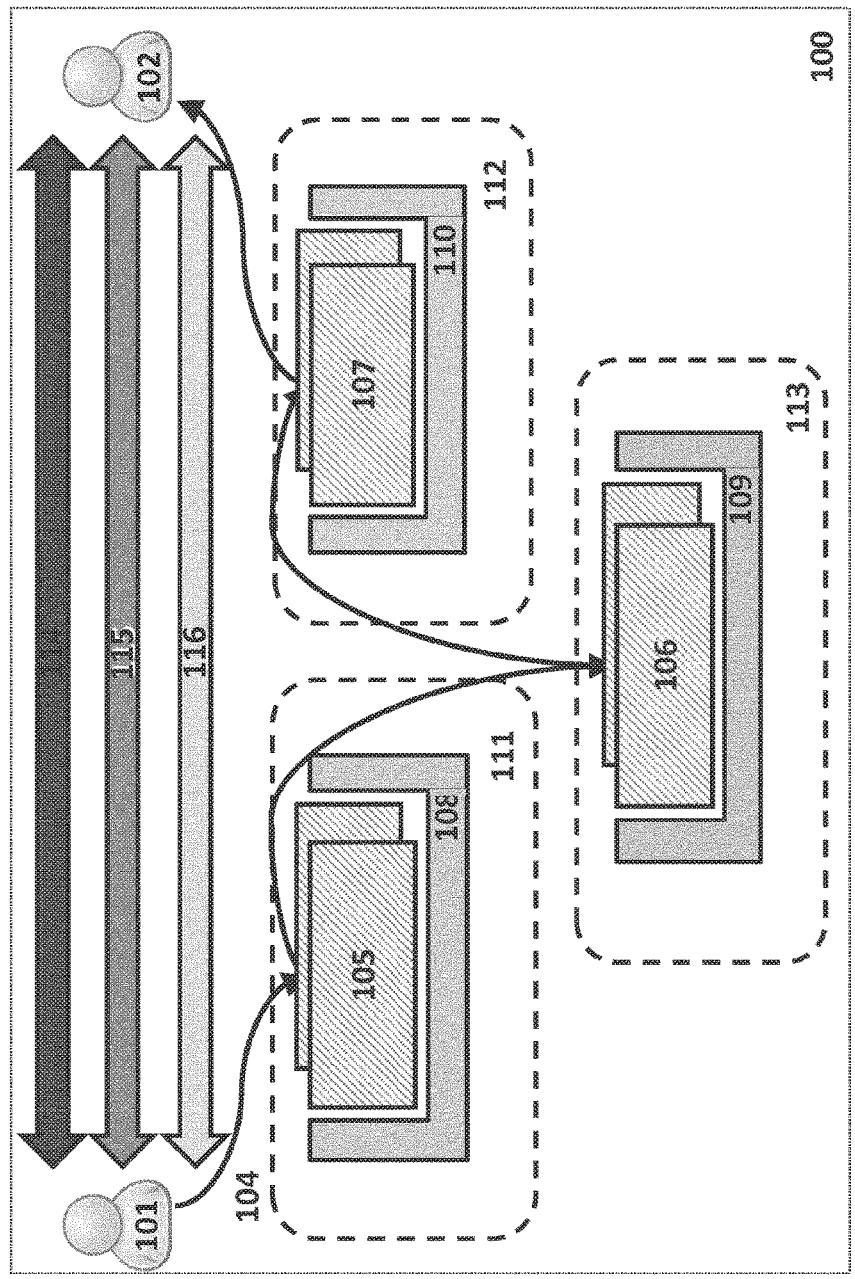
FIG. 1 shows an example of an architecture in which the present invention may be implemented.

FIG. 1 gives an overview of a "Service Connectors Architecture" 100 in which the present invention may be implemented. A contact initiator user 101 establishes a communication link with at least one contact recipient 102 via a Client Agent 105 installed within a Service Proxy Container 108 installed in a software application or browser installed on a computing device 111 associated with the contact initiator user 101. The path 104 indicates how the connection is made between the contact initiator user 101 and the contact recipient 102. The Client Agent 105 connects to at least one Broker Agent 106 installed within a Switch Board Container 109 installed on a Signaling Server 113. Such a Signaling Server provides signaling interfaces to an IP Network using software applications. A Signaling Server in the context of the present invention is operable to perform call control services i.e. registration of terminals and gateways, admission control, IP address translation and bandwidth control. The Broker Agent 106 in turn connects to a Service Agent 107 installed within a Service Agent Container 110 which is installed in a further software application or browser installed on another computing device 112 associated with the contact recipient user 102. The communication link may comprise at least one of a video stream 114, an audio stream 115 and/or a data stream 116.

The interactions between the individual key elements of the present invention are mainly a Remote Procedure Call (RPC) type of interaction. Therefore these interactions are implemented on top of an appropriate underlying communication mechanism. Non-exclusive examples of such a communication mechanism are Object Request Broker (ORB), Representational State Transfer (REST) API, Extensible Messaging and Presence Protocol (XMPP) extensions or Session Initiation Protocol (SIP) extensions.

The following technical details are provided in order to aid understanding of how the present invention may be implemented and are described in an abstract language (similar to WebIDL for interface definition and JavaScript for the Pseudo Code). However, it will be understood by the skilled person that the invention may also be implemented in other languages, preferably the most appropriate language for a particular underlying platform. A few examples thereof are C# for Windows devices, Java for Android devices, Objective C for iOS devices and JavaScript for Web applications.

The following sub-sections introduce the main data types that may preferably be used in order to implement the present invention. These data types are subsequently completed in the appropriate sections. Only information relevant to the main heading of the section is described. Furthermore, constraints when required are described as DOMString. It will be understood that this may also be implemented using a more sophisticated approach such as appropriate XML or JSON encoding.

Generic Handle Interface

```
interface Handle {
    attribute DOMString uri;
    attribute DOMString uuid;
    ...
}
``` uri Uniform resource identifier (URI) of the server managing the object referenced by the handle uuid Universally unique identifier (UUID) of the object referenced by the handle in the server managing the object Specific Handle Interfaces

```
interface ConnectorManagementHandle : Handle {
    ...
}
interface ClientConnectorAgentDescriptorHandle : Handle {
    ...
}
interface BrokerConnectorAgentDescriptorHandle : Handle {
    ...
}
interface ServiceConnectorAgentDescriptorHandle : Handle {
    ...
}
```

Descriptors are initialized or updated using forms exchanged between the Service Connector Factory and the Service Connector Administrator. The agent running the Service Connector Administrator is in charge of gathering the information required in the form from the user by appropriate means such as a generic form user interface or a more specific graphical user interface (GUI). This might require multiple exchanges in order to complete the information gathering process.

Form Interfaces

```
interface FormItem {
    attribute DOMString name;
    attribute DOMString type;
    attribute DOMString value;
}
name Name of the item
type Type of the item
value Value of the item
interface DescriptorForm {
    attribute sequence<FormItem> formItems;
}
```

Service Connector Factory Interface

```
interface ServiceConnectorFactory {
    ...
}
```

Media Stream & Data Channel Interfaces

```
interface MediaStream {
    attribute DOMString id;
    attribute sequence<MediaStreamTrack> audioTracks;
    attribute sequence<MediaStreamTrack> videoTracks;
    ...
}
interface MediaStreamTrack {
    attribute DOMString kind; // video - audio
    attribute DOMString id;
    ...
}
interface DataChannel {
    attribute DOMString id;
    ...
}
```

Authentication, Privacy and Permission Management

In accordance with the present invention, permissions management is handled at a fine-grained level. Permissions are associated to each interaction between agents. These permissions are set during the creation of a Service Connector. Generic policies may be enforced by the Service Connector Factory. Permissions control is implemented using passwords or access tokens. Access tokens are time-limited opaque strings that include the identity of the agents and the associated rights of the particular agents. Mechanisms such as the open standard for authorization "OAuth2" can be used to implement these tokens. As discussed in the summary of invention, this approach allows to leverage external authentication services such as authentication services provided by social networks (e.g. Facebook, Google+, Yahoo, . . . ), by professional social networks (e.g. LinkedIn, . . . ) or enterprise authentication infrastructure. When permission control is required Handle objects preferably contain identity provider information.

Interfaces

```
interface Handle {
    ...
    attribute DOMString identityProvider;
    ...
}
```

The identityProvider field is used to get access to authentication tokens.

Service Connector Administrator and Service Connector Factory 200

Figure 2:
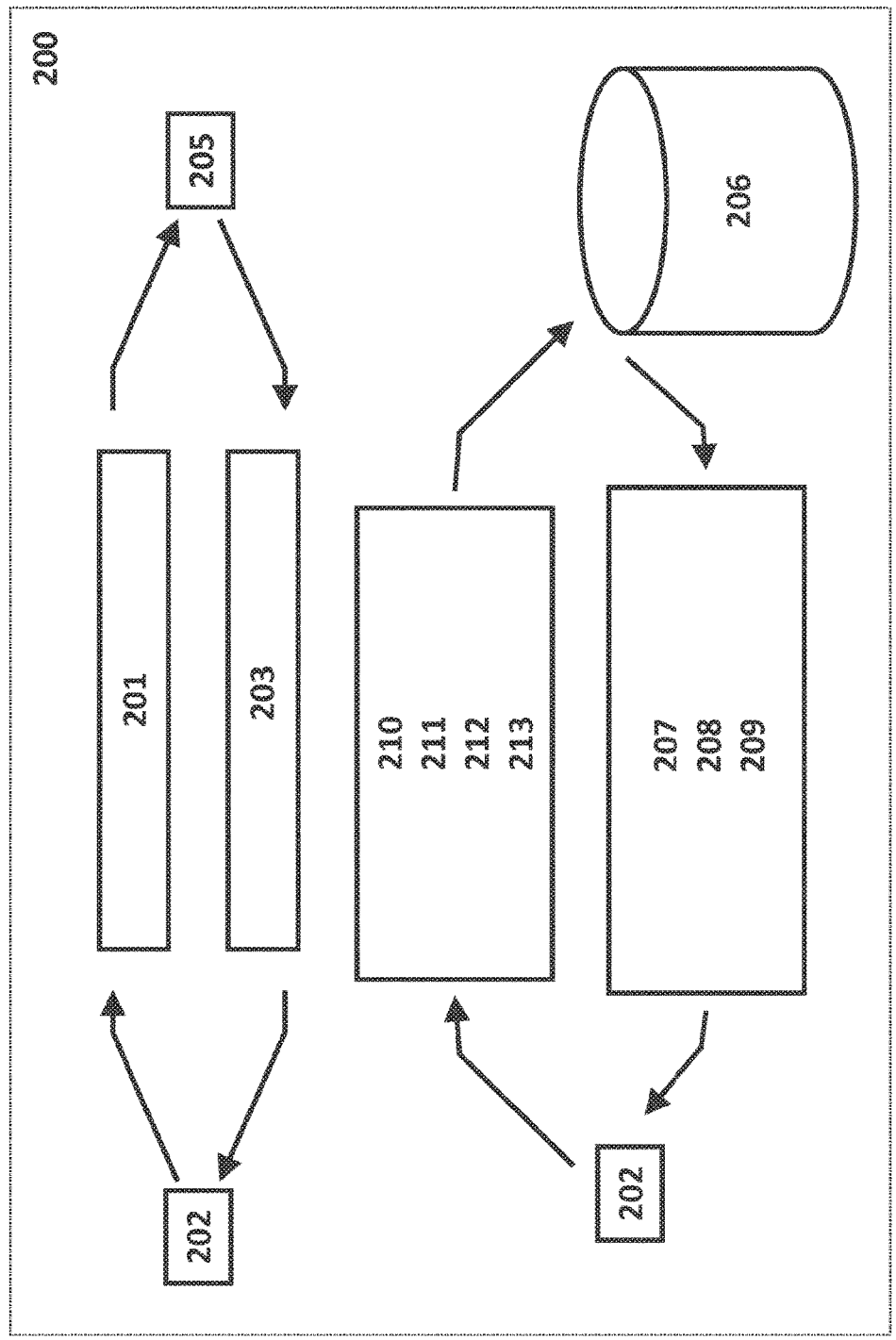
FIG. 2 shows an example of interactions between a Service Connector Administrator and a Service Connector Factory and Service Connector Repository in accordance with one aspect of the present invention.
Figure 9:
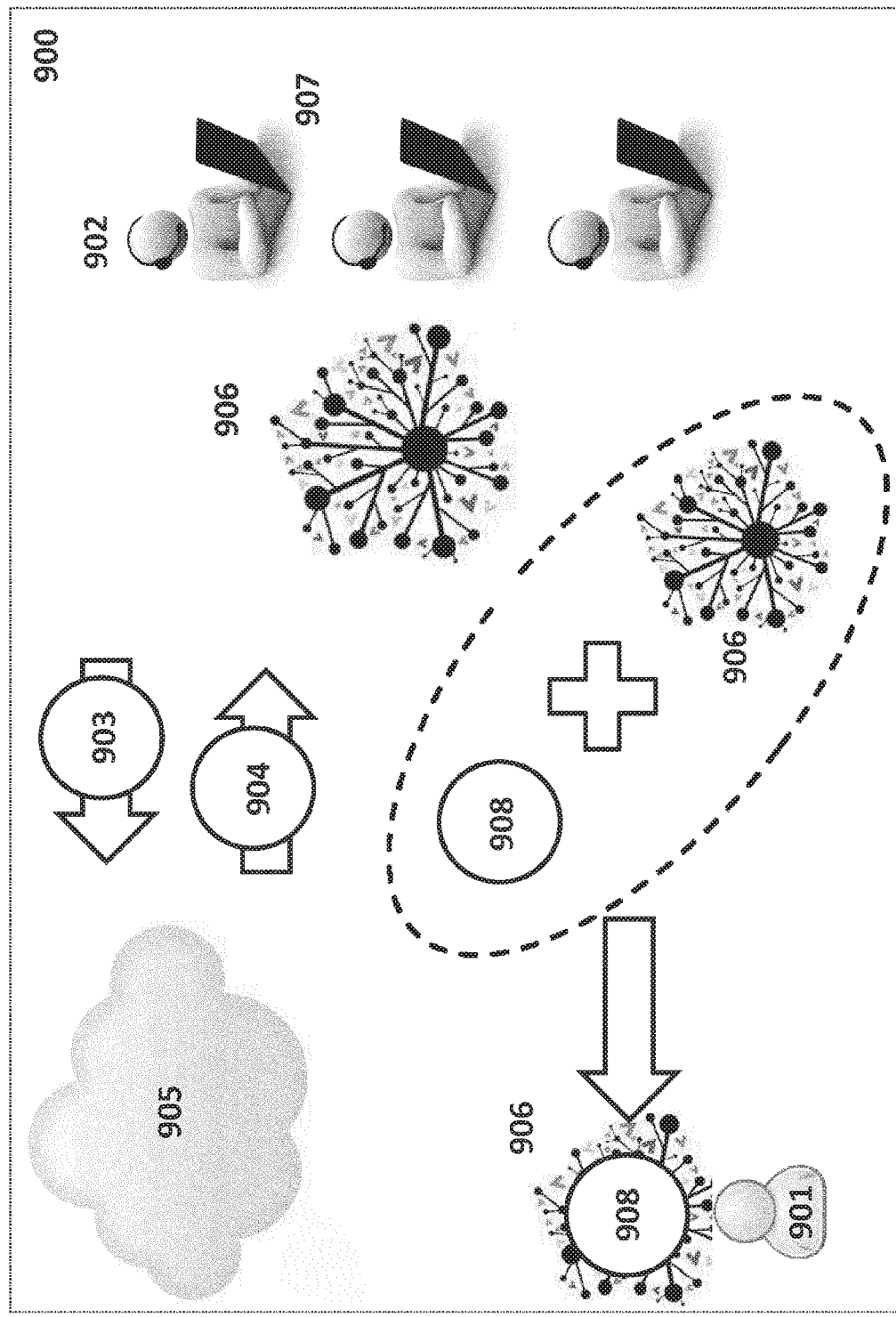
FIG. 9 shows an example of a service proxy button being generated according to the present invention.

In the context of the present invention, a means for administering the establishment of communication links between users such as service connections is known as a "Service Connector Administrator" 202. The Service Connector Administrator accesses a "Service Connector Factory" 205 which is responsible for defining the relevant descriptors and returning the corresponding Handles to enable the relevant connections between the Client and Service Agents to be made. As illustrated in FIGS. 2 and 9, the Service Connector Administrator 202 may comprise a software agent which is able to establish a connection with a "Service Connector Factory" 205, 905 by signing in. The Service Connector Factory 205, 905 is a means provided to enable the Service Connector Administrator 202 to access a "Service Connector Management Agent" (not shown). In step 201, the Service Connector Administrator 202 requests the Service Connector Factory 205, 905 to create a Service Connector and the Service Connector Factory in turn provides a "Connector Management Handle" 203 which allows the Service Connector Administrator 202 to access the Service Connector Management Agent.

Interfaces

```
interface ServiceConnectorFactory {
    ...
    boolean signIn(DOMString authToken);
    ConnectorManagementHandle createServiceConnector( );
}
```

PseudoCode

```
var factoryURI = . . .; // factory URI initialization
var factory = new ServiceConnectorFactory(factoryURI);
var authToken = . . .; // authentication token initialization
if (factory.signIn(authToken)) {
    var ConnectorManagementHandle =
    factory.createServiceConnector( );
}
```

The "Service Connector Management Agent" is a means used by the Service Connector Administrator 202 to define the contents of each of the "Service Connector Agents" i.e., the "Client Connector Agent Descriptor" 210; the "Broker Connector Agent Descriptor" 211; the "Service Connector Agent Descriptor" 212 and the "Connector Agents Interaction Graph" 213. The Service Connector Factory stores these descriptors in the "Service Connector Repository" 206, which may comprise a form of database. The Service Connector Repository 206 returns a "Handle" to the Service Connector Administrator 202 for each of the Service Connector Agents, i.e. providing a "Client Connector Agent Descriptor Handle" 207; a "Broker Connector Agent Descriptor Handle" 208 and a "Service Connector Agent Descriptor Handle" 209. These "Connector Handles" form an identification means by which Client 105 and Service Agent Connectors 107 may connect with a Broker Connector Agent 106. In the context of the claims, these handles are the intelligent tokens generated in order to establish the communication links between contact initiator users and contact recipient users.

Interfaces

```
interface ServiceConnectorFactory {
    ...
        // get the Client Connector Agent Descriptor Handle
    ClientConnectorAgentDescriptorHandle
        getClientConnectorAgentDescriptorHandle(
            ConnectorManagementHandle handle,
            DOMString authToken);
        // get the Broker Connector Agent Descriptor Handles
    sequence<BrokerConnectorAgentDescriptorHandle>
        getBrokerConnectorAgentDescriptorHandle(
            ConnectorManagementHandle handle,
            DOMString authToken);
        // get the Service Connector Agent Descriptor Handle
    ServiceConnectorAgentDescriptorHandle
        getServiceConnectorAgentDescriptorHandle(
            ConnectorManagementHandle handle,
            DOMString authToken);
    ...
}
```

PseudoCode

```
var factory = . . .;
var connectorManagementHandle = . . .;
var authToken = null;
if (connectorManagementHandle.identityProvider) {
        // Get the authentication token using the Identity Provider
        authToken = . . .;
}
        // Get Client Connector Agent Descriptor Handle
var clientConnectorAgentDescriptorHandle =
    factory.getClientConnectorAgentDescriptorHandle(
        connectorManagementHandle, authToken);
        // Get Broker Connector Agent Descriptor Handles
var brokerConnectorAgentDescriptorHandles =
    factory.getBrokerConnectorAgentDescriptorHandle(
        connectorManagementHandle, authToken);
        // Get Service Connector Agent Descriptor Handle
var serviceConnectorAgentDescriptorHandle =
    factory.getServiceConnectorAgentDescriptorHandle(
        connectorManagementHandle, authToken);
```

Service Connector Repository 206, 306, 406, 506, 606, 706

The Service Connector Repository 206, 306, 406, 506, 606, 706 comprises a form of database that contains all the information defining the Service Connector Agents, provided by the Service Connector Factory 205 on behalf of the Service Administrator i.e. the Client Connector Agent Descriptor 210; the Broker Connector Agent Descriptor 211; the Service Connector Agent Descriptor 212; and the Connector Agents Interaction Graph 213.

Broker Connector Agent Descriptor 211

In the context of the present invention, the Broker Connector Agent 106 acts as a Service Switch Board i.e. brokering connections between Client 101 and Service Agents 102. The Broker Connector Agents 106 route the communication paths as necessary/desired.

Interfaces

```
interface IncomingDescriptor {
    attribute DOMString id;
    attribute Boolean indexed;
    attribute sequence<MediaStream> mediaStreamSources;
    attribute sequence<MediaStream> mediaStreamSinks;
    attribute sequence<DataChannel> dataChannelSources;
    attribute sequence<DataChannel> dataChannelSinks;
    ...
}
interface OutgoingDescriptor {
    attribute DOMString id;
    attribute Boolean indexed;
    attribute sequence<MediaStream> mediaStreamSources;
    attribute sequence<MediaStream> mediaStreamSinks;
    attribute sequence<DataChannel> dataChannelSources;
    attribute sequence<DataChannel> dataChannelSinks;
    ...
}
interface Binding {
    attribute sequence<DOMString> fromIds;
    attribute sequence<DOMString> toIds;
    attribute DOMString type;
    ...
}
interface SwitchBoardDescriptor {
    attribute DOMString id;
    attribute IncomingDescriptor incomingDescriptor;
    attribute OutgoingDescriptor outgoingDescriptor;
    attribute sequence<Binding> bindings;
    attribute sequence<DOMString> constraints;
    ...
}
interface ServiceConnectorFactory {
    ...
        // Create a SwitchBoardDescriptor
    FormDescriptor createSwitchBoardDescriptor(
        ConnectorManagementHandle handle,
        FormDescriptor formDescriptor,
        DOMString authToken);
        // Update a SwitchBoardDescriptor
    FormDescriptor updateSwitchBoardDescriptor(
        ConnectorManagementHandle handle,
        FormDescriptor formDescriptor,
        DOMString authToken);
    ...
}
```

Setting the indexed attribute of IncomingDescriptor (respectively OutgoingDescriptor) to true allows the connection of multiple Clients Connector Agents 105 (respectively Service Connector Agents 107). During a communication link such as an audio or video call, name matching is used to dynamically bind the media tracks and data channels of the Client Connector Agent 105 (respectively Service Connector Agent 107) and the media tracks and data channels of the Switch Board defined in the incomingDescriptor field (respectively outgoingDescriptor) of the selected Switch Board Descriptor.

PseudoCode

```
var factory = . . .;
var authToken = . . .;
var connectorManagementHandle = . . .;
// Create a media stream passthrough SwitchBoardDescriptor
var formDescriptor = {
    formItems: {{
        name: 'in',
        type: 'SwitchBoardDescriptor,
        value: {
            id: 'passthrough',
            incomingDescriptor: {
                id: 'incoming',
                mediaStreamSources: {{
                    id: 'source',
                    audioTracks: {{kind: 'audio', id: 'audioTrack'}},
                    videoTracks: {{kind: 'video', id: 'videoTrack'}},
                }},
                mediaStreamSinks: {{
                    id: 'sink',
                    audioTracks: {{kind: 'audio', id: 'audioTrack'}},
                    videoTracks: {{kind: 'video', id: 'videoTrack'}},
                }}
            },
            outgoingDescriptor: {
                id: 'outgoing',
                mediaStreamSources: {{
                    id: 'source',
                    audioTracks: {{kind: 'audio', id: 'audioTrack'}},
                    videoTracks: {{kind: 'video', id: 'videoTrack'}},
                }},
                mediaStreamSinks: {{
                    id: 'sink',
                    audioTracks: {{kind: 'audio', id: 'audioTrack'}},
                    videoTracks: {{kind: 'video', id: 'videoTrack'}},
                }}
            },
            bindings: {{
                fromIds: {'incoming.source.audioTrack'},
                toIds: {'outgoing.sink.audioTrack'},
                type: 'passthrough'
            },{
                fromIds: {'incoming.source.videoTrack'},
                toIds:{'outgoing.sink.videoTrack'},
                type: 'passthrough'
            },{
                fromIds: {'outgoing.source.audioTrack'},
                toIds:{'incoming.sink.audioTrack'},
                type: 'passthrough'
            },{
                fromIds: {'outgoing.source.videoTrack'},
                toIds:{'incoming.sink.videoTrack'},
                type: 'passthrough'
            }},
            constraints: {
                '#incoming == 1',
                '#outgoing == 1'
            }
        }
    }}
};
factory.createSwitchboardDescriptor(
    connectorManagementHandle, formDescriptor, authToken);
```

The described Switch Board can be activated only if there is at least one Service Agent connected to the Broker Connector Agent 106 (constraint: #outgoing==1'). Furthermore, only one Client Agent 105 can call the Service Agent 107 through this Switch Board at a time (constraint: #incoming==1'). It is possible to associate multiple Switch Boards within the same Broker Connector Agent Descriptor 211. The Interaction Graph Descriptor 213 allows the Broker Connector Agent 106 to set up the interaction between Client Connector Agents 105 and Service Connector Agents 107, this includes the selection of the Switch Board descriptor to use, the activation of this Switch Board if it is not yet activated and the routing of the connection requests using the information provided in the Switch Board descriptor.
Interfaces

```
interface InteractionGraphDescriptor {
    attribute DOMString id;
    attribute DOMString switchBoardId;
    attribute short priority;
    attribute sequence <DOMString> constraints;
}
interface ServiceConnectorFactory {
    ...
            // Create an InteractionGraphDescriptor
    FormDescriptor createInteractionGraphDescriptor(
        ConnectorManagementHandle handle,
        FormDescriptor formDescriptor,
        DOMString authToken);
            // Update an InteractionGraphDescriptor
    FormDescriptor updateInteractionGraphDescriptor(
        ConnectorManagementHandle handle,
        FormDescriptor formDescriptor,
        DOMString authToken);
    ...
}
```

PseudoCode

```
var factory = . . .;
var authToken = . . .;
var connectorManagementHandle = . . .;
var formDescriptor1 = {
    formItems: {{
        name: 'in',
        type: 'InteractionGraphDescriptor',
        value: {
            id: 'passthrough',
            switchBoardId: 'passthrough',
            constraints: {
                {'day is calendar:working_day'},
                {'hour is calendar:working_hour'}
            }
        }
    }}
};
var formDescriptor2 = {
    formItems: {{
        name: 'in',
        type: 'InteractionGraphDescriptor',
        value: {
            id: 'voice_call',
            switchBoardId: 'voice_call',
        }
    }}
};
factory.createInteractionGraphDescriptor(
    connectorManagementHandle, formDescriptor1, authToken);
factory.createInteractionGraphDescriptor(
    connectorManagementHandle, formDescriptor2, authToken);
```

In this example, the first Interaction Graph Descriptor 213 is applicable only during working hours.
Interfaces

```
interface BrokerConnectorAgentDescriptor {
    attribute DOMString id;
    attribute sequence<InteractionGraphDescriptor>
        interactionGraphDescriptorIds;
}
interface ServiceConnectorFactory {
    ...
            // Create a BrokerConnectorAgentDescriptor
    FormDescriptor createBrokerConnectorAgentDescriptor(
        ConnectorManagementHandle handle,
        FormDescriptor formDescriptor,
        DOMString authToken);
            // Update a BrokerConnectorAgentDescriptor
    FormDescriptor updateBrokerConnectorAgentDescriptor(
        ConnectorManagementHandle handle,
        FormDescriptor formDescriptor,
        DOMString authToken);
    ...
}
```

PseudoCode

```
var factory = . . .;
var authToken = . . .;
var connectorManagementHandle = . . .;
var formDescriptor = {
    formItems: {{
        name: 'in',
        type: 'BrokerConnectorAgentDescriptor,
        value: {
            id: 'company_support',
            interactionGraphDescriptorIds: {
                'passthrough',
                'voice_call'
            }
        }
    }}
};
factory.createBrokerConnectorAgentDescriptor(
    connectorManagementHandle, formDescriptor, authToken);
```

The Broker Connector Agent 106 preferably includes a State Machine for connecting several media and/or data streams. Furthermore, the State Machine is the means which determines which Service Agent 107 to call. A plurality of Broker Connector Agents 106 can be chained and thereby implemented to operate as a series of switchboards connected to one another. Broker Connector Agents 106 can advantageously split a connection to several endpoints, e.g. a conference room, a recording device. This beneficially enables multimedia interactions with more than one peer and/or the possibility of saving a record of the multimedia interactions for future reference.

Client Connector Agent Descriptor 210

In the context of the present invention the Client Connector Agent 210 acts as a Service Proxy Button i.e. means for activating a connection between a Client Agent 105 and a Service Agent 107. The Client Connector Agent Descriptor 210 may comprise a set of properties including at least one of the following: Service identification; Authentication Service; Service icons or service button images (these may be trademarks of brands associated with the services); Service button states, e.g. indicating whether a service agent associated with a particular service is Available, Busy or Off Line; Activation number e.g. how many times the button has been used to establish a communication link; Life cycle, e.g. Start, Stop, Pause, Lifetime (the service connection may only be available for a limited time, or until a predetermined time decided by the client); Multimedia parameters, cameras, microphones, speakers; Input streams (audio tracks, video tracks, data channels); Output streams (audio tracks, video tracks, data channels). This list is not exclusive and it will be understood that further properties may also be included. Each of these properties may be tailored individually to the Client Agent 105 when appropriate (e.g. device model, location, localization).

Interfaces

```
interface ResourceDescriptor {
    attribute DOMString id;
    attribute DOMString type;
    attribute DOMString|ByteString value;
    ...
}
interface ClientConnectorAgentDescriptor{
    attribute DOMString id;
    attribute DOMString identityProvider;
    attribute sequence<DOMString> whiteList;
    attribute sequence<DOMString> blackList;
    attribute long leaseTime;
    attribute sequence<ResourceDescriptor> resourceDescriptors;
    attribute sequence<DOMString> states;
    attribute sequence<DOMString> capturerDevices;
    attribute sequence<DOMString> rendererDevices;
    attribute sequence<MediaStream> mediaStreamSources;
    attribute sequence<MediaStream> mediaStreamSinks;
    attribute sequence<DataChannel> dataChannelSources;
    attribute sequence<DataChannel> dataChannelSinks;
    attribute sequence<Binding> bindings;
    attribute sequence<DOMString> constraints;
    ...
}
interface ServiceConnectorFactory {
    ...
        // Create a ClientConnectorAgentDescriptor
    FormDescriptor
        createClientConnectorAgentDescriptor(
            ConnectorManagementHandle handle,
            FormDescriptor formDescriptor,
            DOMString authToken);
        // Update a ClientConnectorAgentDescriptor
    FormDescriptor
        updateClientConnectorAgentDescriptor(
            ConnectorManagementHandle handle,
            FormDescriptor formDescriptor,
            DOMString authToken);
}
```

A resource descriptor might be tailored to a specific device and might be internationalized using adapted resource naming schema (attribute: id of the ResourceDescriptor) such as the approach used for the Android resources naming schema.

PseudoCode

```
var factory = . . .;
var authToken = . . .;
var connectorManagementHandle = . . .;
// Create Client Connector Agent Descriptor
var formDescriptor = {
    formItems: {{
        name: 'in',
        type: 'ClientConnectorAgentDescriptor',
        value: {
            id: 'company_support',
            resourcesDescriptors: {{
                resource: 'res-en:label',
                type: DOMString,
                value: 'Company Support Team'
            }, {
                resource: 'res-android-large:icon',
                type: ByteString,
                value: . . .
            }},
            capturerDevices: {
                'camera:default',
                'microphone:default'
            },
            rendererDevices: {
                'screen:default',
                'speaker:default'
            },
            mediaStreamSources: {{
                id: 'source',
                audioTracks: {{kind: 'audio', id: 'audioTrack'}},
                videoTracks: {{kind: 'video', id: 'videoTrack'}}
            }},
            mediaStreamSinks: {{
                id: 'sink',
                audioTracks: {{kind: 'audio', id: 'audioTrack'}},
                videoTracks: {{kind: 'video', id: 'videoTrack'}}
            }},
            bindings: {{
                fromIds: {'microphone:default'},
                toIds: {'source.audioTrack'}
            }, {
                fromIds: {'camera:default'},
                toIds: {'source.videoTrack'}
            }, {
                fromIds: {'sink.audioTrack'},
                toIds: {'speaker:default'}
            }, {
                fromIds: {'sink.videoTrack'},
                toIds: {'screen:default'}
            }},
            constraints: {
                'callDuration <= 3600s',
                'maxCalls <= 16'
            }
        }
    }}
};
factory.createClientConnectorAgentDescriptor(
    connectorManagementHandle, formDescriptor, authToken);
```

In this example, no authentication is required thereby allowing anonymous communication links such as multimedia calls to be established. The maximum duration of such a call is set to 3600 s. No more than 16 calls can be done using this Client Connector Agent Descriptor 210. It is possible to update dynamically the created Client Connector Descriptor 210 using the updateClientConnectorAgentDescriptor( ) method.

PseudoCode

```
var factory = . . .;
var authToken = . . .;
var connectorManagementHandle = . . .;
// Update Client Connector Agent Descriptor
var formDescriptor = {
    formItems: {{
        name: 'in',
        type: 'ClientConnectorAgentDescriptor',
        value: {
            id: 'company_support',
            identityProvider: 'Facebook'
        }
    }}
};
factory.updateClientConnectorAgentDescriptor(
    connectorManagementHandle, formDescriptor, authToken);
```

The identity provider has been defined in this example. After this update, users must identify through Facebook before being able to place a call using this Client Connector Agent Descriptor 210.

During a communication link such as a video or audio call, name matching is used to dynamically bind the media tracks and data channels of the Client Connector Agent 105 (defined in the Client Connector Agent Descriptor 210) and the media tracks and data channels of the Broker Connector Agent 106 (defined in the incomingDescriptor field of the selected Switch Board Descriptor).

Service Connector Agent Descriptor

In the context of the present invention the Service Connector Agent Descriptor 212 acts as a Service Proxy Button i.e. means for enabling a connection between a Service Agents 107 and Client Agents 105. The Service Connector Agent Descriptor 212 may comprise a set of properties including at least one of the following: Service Agent identity; Service identification and authentication; Service icons or service button images; Agent logged in; Agent presence, e.g. Available, Busy, Off-Line; Life cycle, e.g. Start, Stop, Pause, Lifetime; Multimedia parameters, cameras, microphones, speakers; Input streams (audio tracks, video tracks, data channels); Output streams (audio tracks, video tracks, data channels). This list is not exclusive and it will be understood that further properties may also be included. Each of these properties may be tailored individually to the Service Agent 107 when appropriate (e.g. device model, location, localization).

Interfaces

```
interface ServiceConnectorAgentDescriptor{
    attribute DOMString id;
    attribute DOMString identityProvider;
    attribute long leaseTime;
    attribute sequence<ResourceDescriptor> resourceDescriptors;
    attribute sequence<DOMString> states;
    attribute sequence<DOMString> capturerDevices;
    attribute sequence<DOMString> rendererDevices;
    attribute sequence<MediaStream> mediaStreamSources;
    attribute sequence<MediaStream> mediaStreamSinks;
    attribute sequence<DataChannel> dataChannelSources;
    attribute sequence<DataChannel> dataChannelSinks;
    attribute sequence<Binding> bindings;
    attribute sequence<DOMString> constraints;
    ...
}
interface ServiceConnectorFactory {
    ...
    // Create a ServiceConnectorAgentDescriptor FormDescriptor
        createServiceConnectorAgentDescriptor(
            ConnectorManagementHandle handle,
            FormDescriptor formDescriptor,
            DOMString authToken);
    // Update a ServiceConnectorAgentDescriptor FormDescriptor
        updateServiceConnectorAgentDescriptor(
            FormDescriptor formDescriptor,
            ConnectorManagementHandle handle,
            DOMString authToken);
}
```

PseudoCode

```
var factory = ...;
var authToken = ...;
var connectorManagementHandle = ...;
// Create Service Connector Agent Descriptor
var formDescriptor = {
    formItems: {{
        name: 'in',
        type: 'ServiceConnectorAgentDescriptor',
        value: {
            id: 'Company Support Member',
            identityProvider: 'company.com',
            resourcesDescriptors: {{
                resource: 'res-en:label',
                type: DOMString,
                value: 'Company Support Team Member'
            }, {
                resource: 'res-android-large:icon',
                type: ByteString,
                value: ...
            }},
            capturerDevices: {
                'camera:default',
                'microphone:default'
            },
            rendererDevices: {
                'screen:default',
                'speaker:default'
            },
            mediaStreamSources: {{
                id: 'source',
                audioTracks: {{kind: 'audio', id: 'audioTrack'}},
                videoTracks: {{kind: 'video', id: 'videoTrack'}}
            }},
            mediaStreamSinks: {{
                id: 'sink',
                audioTracks: {{kind: 'audio', id: 'audioTrack'}},
                videoTracks: {{kind: 'video', id: 'videoTrack'}}
            }},
            bindings: {{
                fromIds: {'microphone:default'},
                toIds:{'source.audioTrack'}
            },{
                fromIds: {'camera:default'},
                toIds: {'source.videoTrack'}
            },{
                fromIds: {'sink.audioTrack'},
                toIds:{'speaker:default'}
            },{
                fromIds: {'sink.videoTrack'},
                toIds: {'screen:default'}
            }},
            constraints: {
                'callDuration <= 3600s',
            }
        }
    }}
};
factory.createServiceConnectorAgentDescriptor(
    connectorManagementHandle, formDescriptor, authToken);
```

During a communication link such as a video or audio call, name matching is used to dynamically bind the media tracks and data channels of the Service Connector Agent 105 (defined in the Service Connector Agent Descriptor 212) and the outgoing media tracks and data channels of the Broker Connector Agent 106 (defined in the outgoingDescriptor field of the selected Switch Board Descriptor).

Broker Connector Agent Deployment 300

Figure 3:
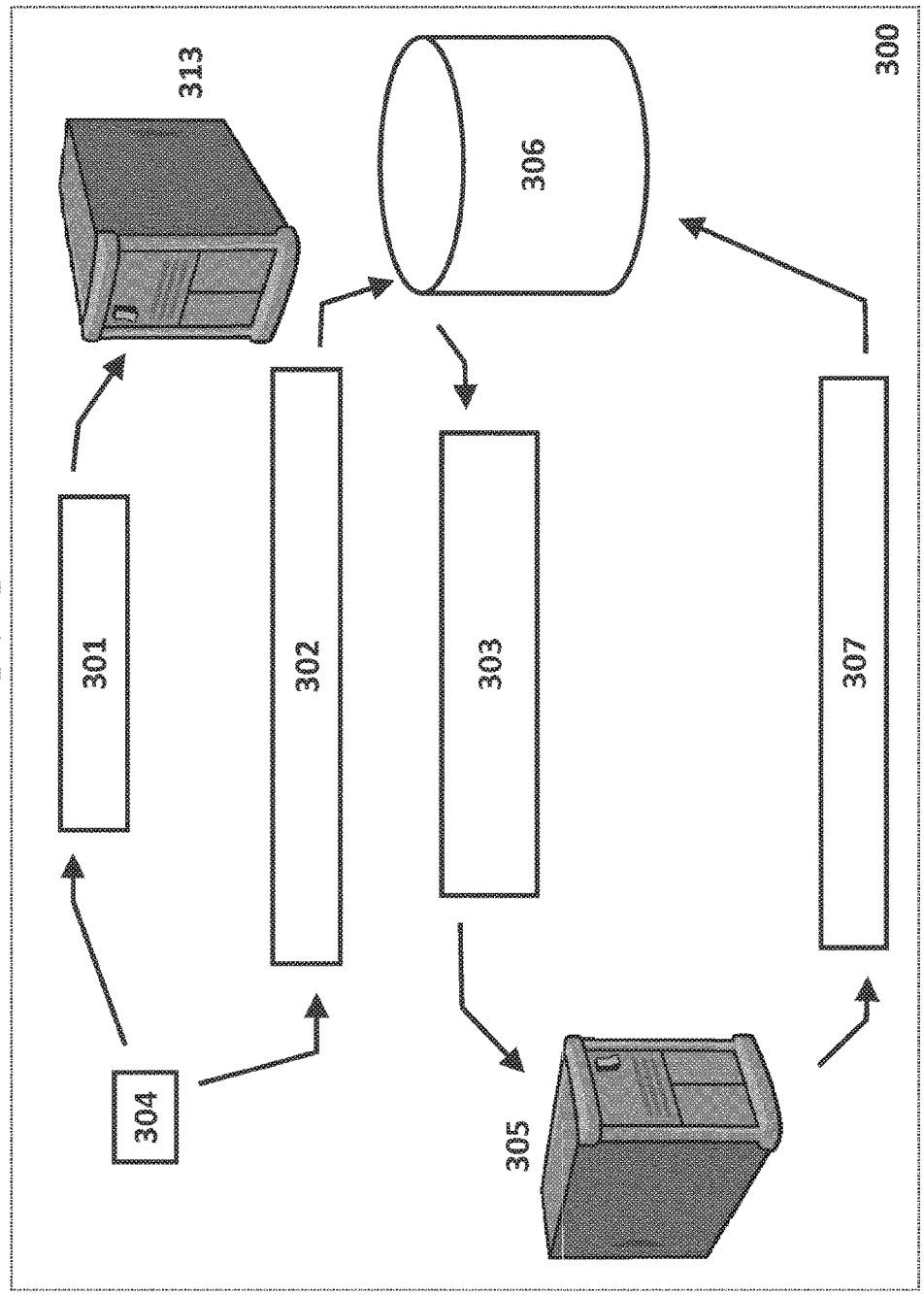
FIG. 3 shows an example of the deployment of a Broker Connector Agent in accordance with a preferred embodiment of the present invention.

In a preferred implementation of the present invention, the Broker Connector Agent may be deployed in the following manner as illustrated in FIG. 3 and also described with reference to FIGS. 1 and 2. In a first interaction 301, the Service Connector Administrator 304 signs in with the Signaling Server 313 which may comprise the Broker Connector Agent Container 109, i.e. "Switch Board" Container. In a second interaction, the Service Connector Administrator 304 connects to the Broker Connector Agent Container by activating the Broker Connector Agent Descriptor Handle 302. In response, the Broker Connector Agent Container 313 retrieves the Broker Connector Agent Descriptor 211 from the Service Connector Repository 306 and installs the Broker Connector Agent 303, preferably in a Broker Server 305 acting as a Service Switchboard. The Service Connector Administrator 304 launches the Broker Connector Agent 106. Based on the Broker Connector Agent Descriptor 211, the Broker Connector Agent Container 109 generates Connector Handles to be used by the Client 105 and Service Agent Connectors 107 to connect with the Broker Connector Agent 106. Connector Handles are stored in the Service Connector Repository 306 as part of the Connector Descriptors. Once the Broker Connector Agent has been deployed 303, both Client 105 and Service Agents 107 may be deployed 307 in order to establish a communication link between one another.

Client Connector Agent Deployment 400 and 500

Figure 4:
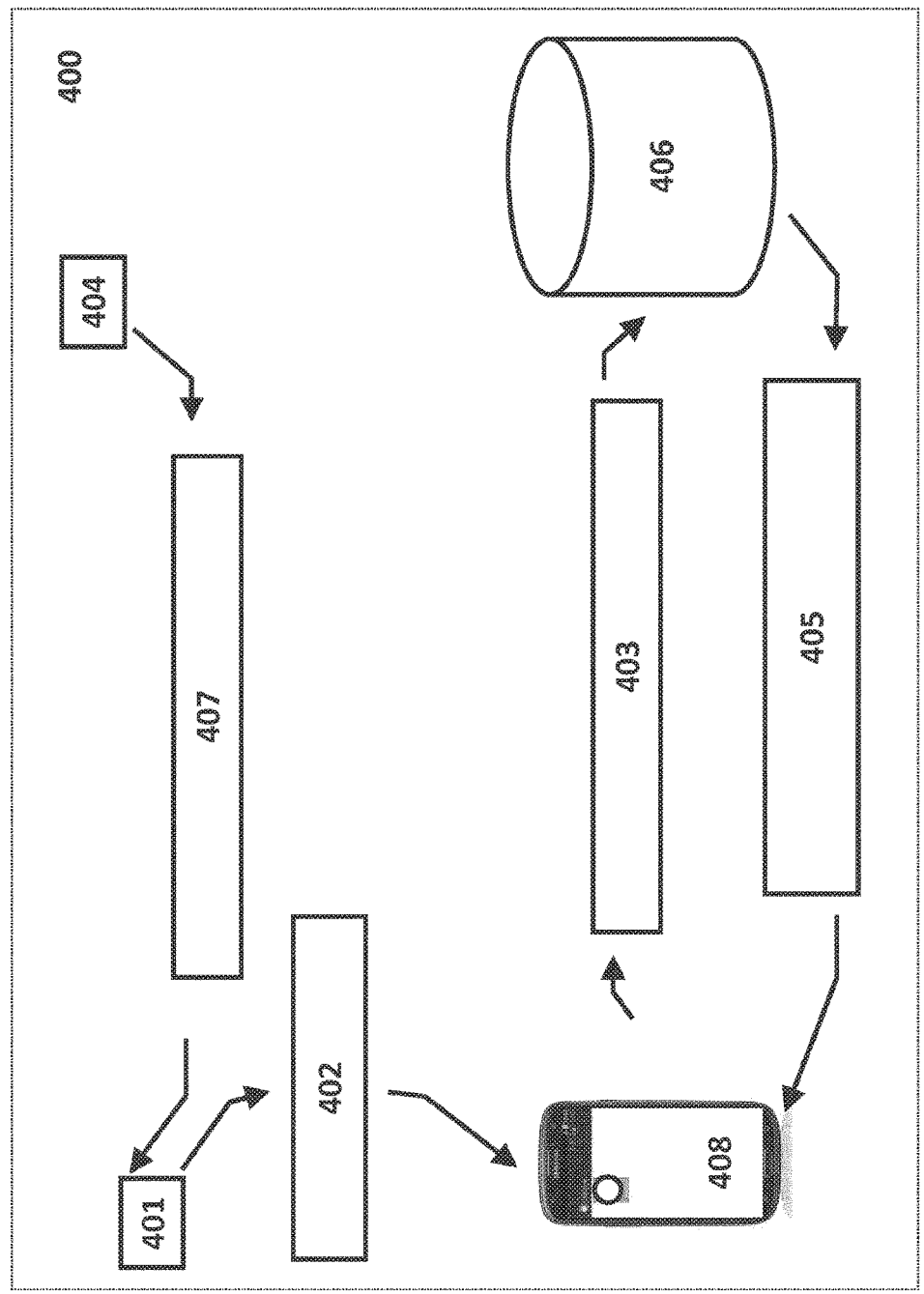
FIG. 4 shows an example of the deployment of the Client Connector Agent in a mobile device application in accordance with a preferred embodiment of the present invention.
Figure 5:
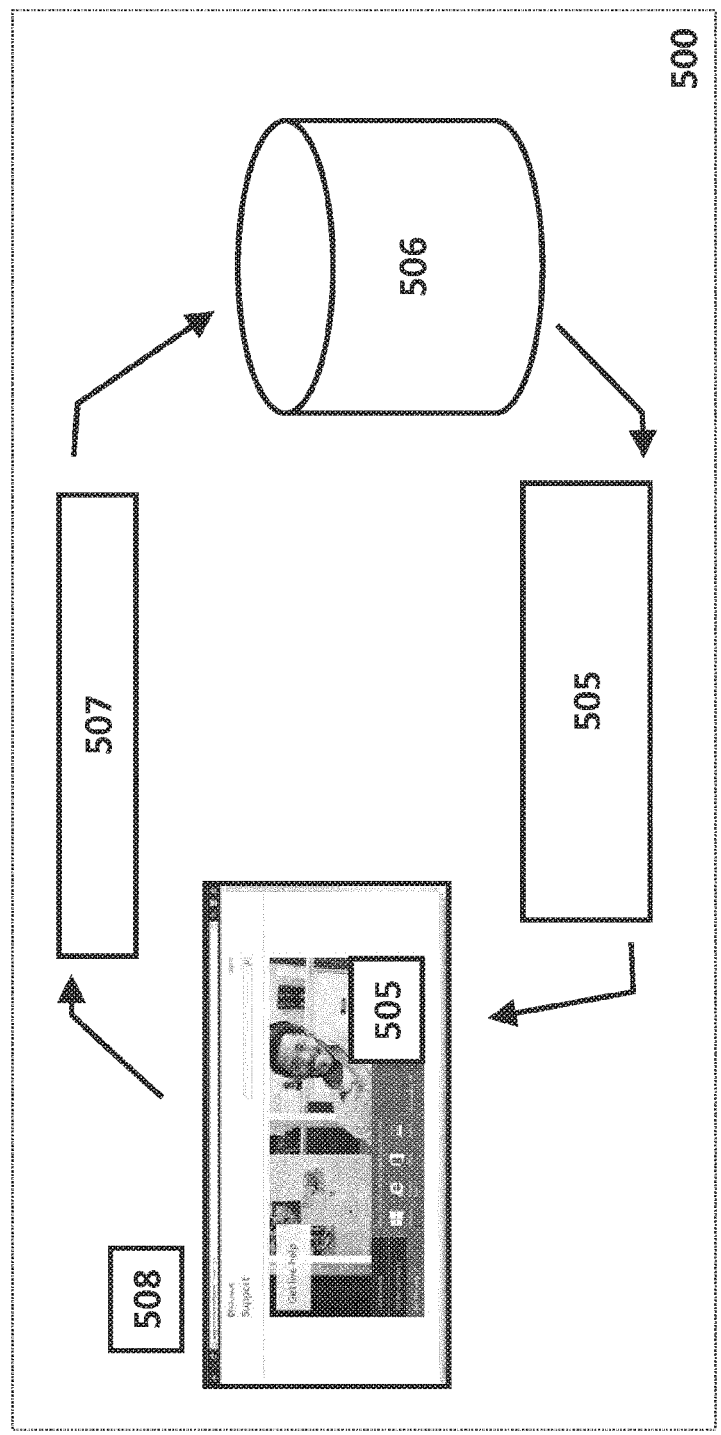
FIG. 5 shows an example of the deployment of the Client Connector Agent in a web application in accordance with a preferred embodiment of the present invention.
Figure 10:
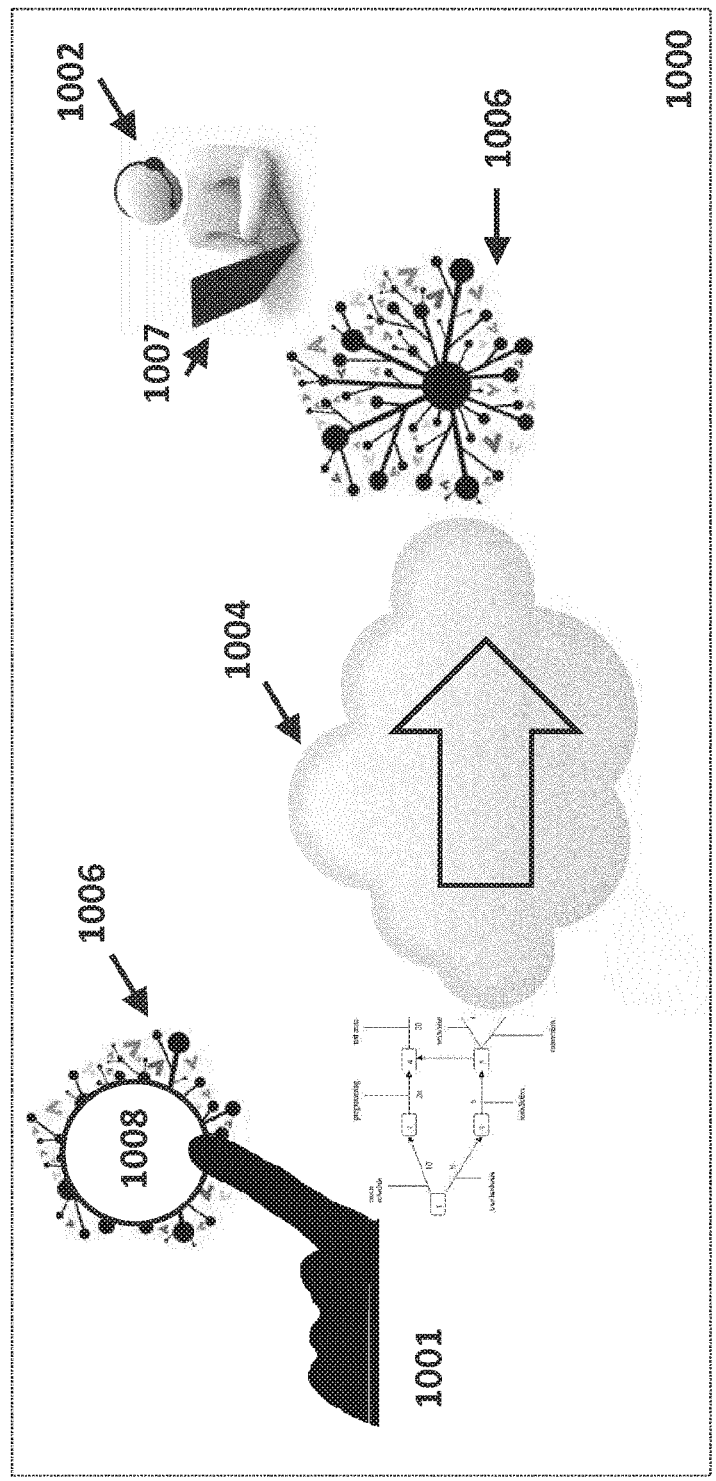
FIG. 10 shows an example of a peer-to-peer multimedia communication link being established according to the present invention.

In preferred implementations of the present invention, the Client Connector Agent 105 of FIG. 1 may be deployed in the following manner as illustrated in FIGS. 4, 5 and 10 which respectively show deployment within a mobile device and in a web application. Firstly, the Service Connector Administrator 404 communicates the Client Connector Agent Descriptor Handles 407 to clients 401 i.e. contact initiator users by unspecified means, for example, e-mail, SMS, URL, QR-Code, location information. The client 401 then imports 402 the Client Connector Agent Descriptor Handle 407 they have received from the Service Administrator 404 into a software application installed on a computing device associated with them. In FIG. 4, the Handle is installed into the client container 408 which is, in this example, a generic application installed on a mobile device. The computing device of the client 401 subsequently initiates a communication link with the Service Connector Repository 406 through activation 403 of the Client Connector Agent Descriptor Handle 407 they have received from the Service Administrator 404 in order to retrieve information from the Service Connector Repository 406 based on Client Connector Agent Descriptor Handle 407. The Client Connector Agent is then installed 405 in the Client Connector Agent Container 408, i.e. a "Service Button" installed within and by the Client Container 408 (mobile software application), using the information retrieved from the Service Connector Repository 406, the service button providing a means for the client 401 to activate the Client Connector Agent.

As illustrated in FIG. 5, the Client Connector Agent may also be installed 505, for example, by a software (web) application within a browser application 508 as an alternative to a button in a mobile device application as illustrated in FIG. 4. In this case the web application connects to the Service Administrator which, in turn, initiates a connection to the Service Connector Repository 506 using the Client Connector Agent Descriptor Handle 507 and retrieves information from the Service Connector Repository 506 based on the Client Connector Agent Descriptor Handle 507. The retrieved information then enables the web application to install 505 the Client Connector Agent as a "Service Button" (as described above, preferably within a Container within the web application wherein the Service Button is also installed by the Container) and thus accessible via the client browser 501. The client i.e. contact initiator may then simply click on the installed Service Button 505 to establish an anonymous peer-to-peer communication link with an unspecified Service Agent i.e. contact recipient user.

Service Connector Agent Deployment 600 and 700

Figure 6:
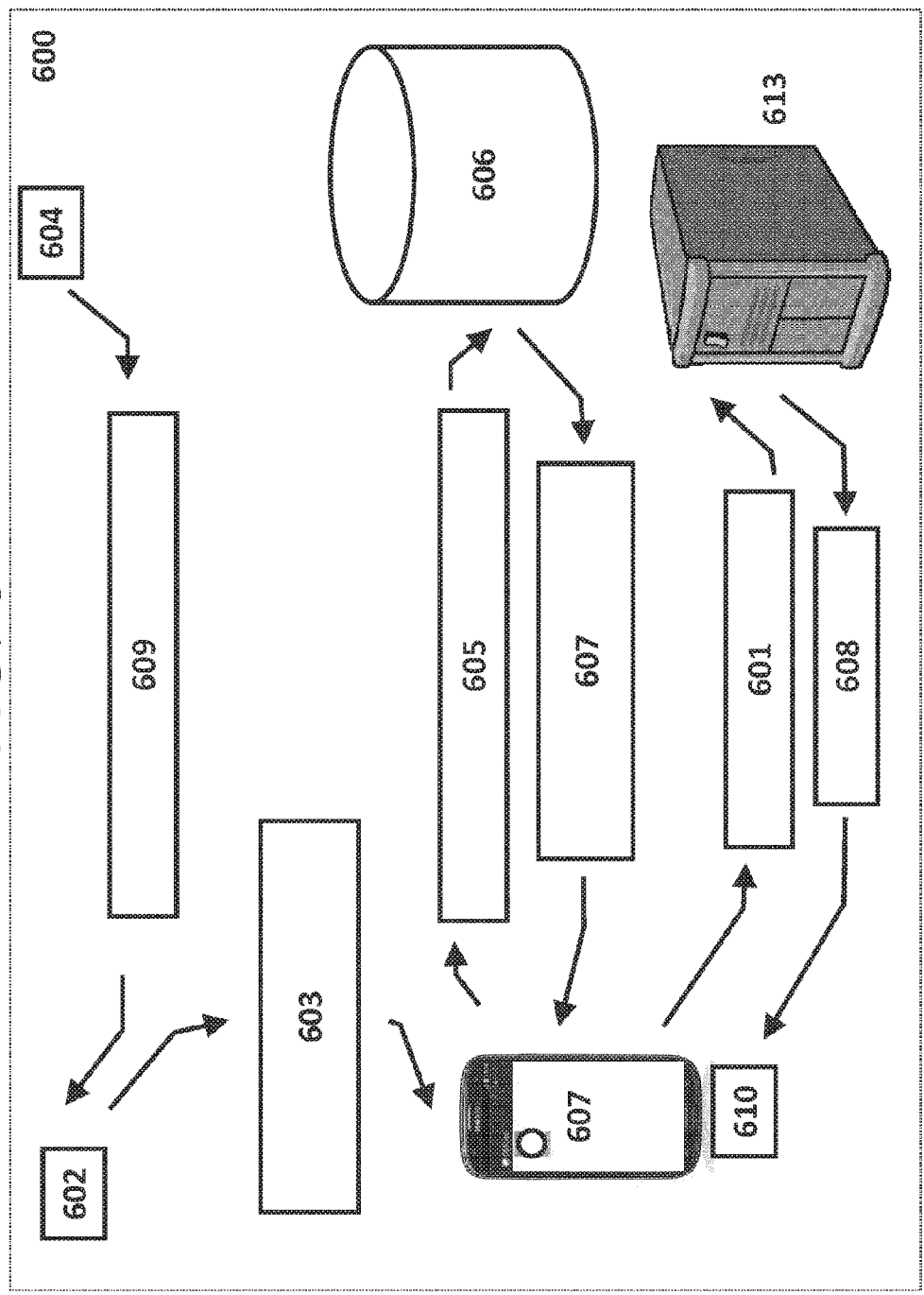
FIG. 6 shows an example of the deployment of the Service Connector Agent in a mobile device application in accordance with a preferred embodiment of the present invention.
Figure 7:
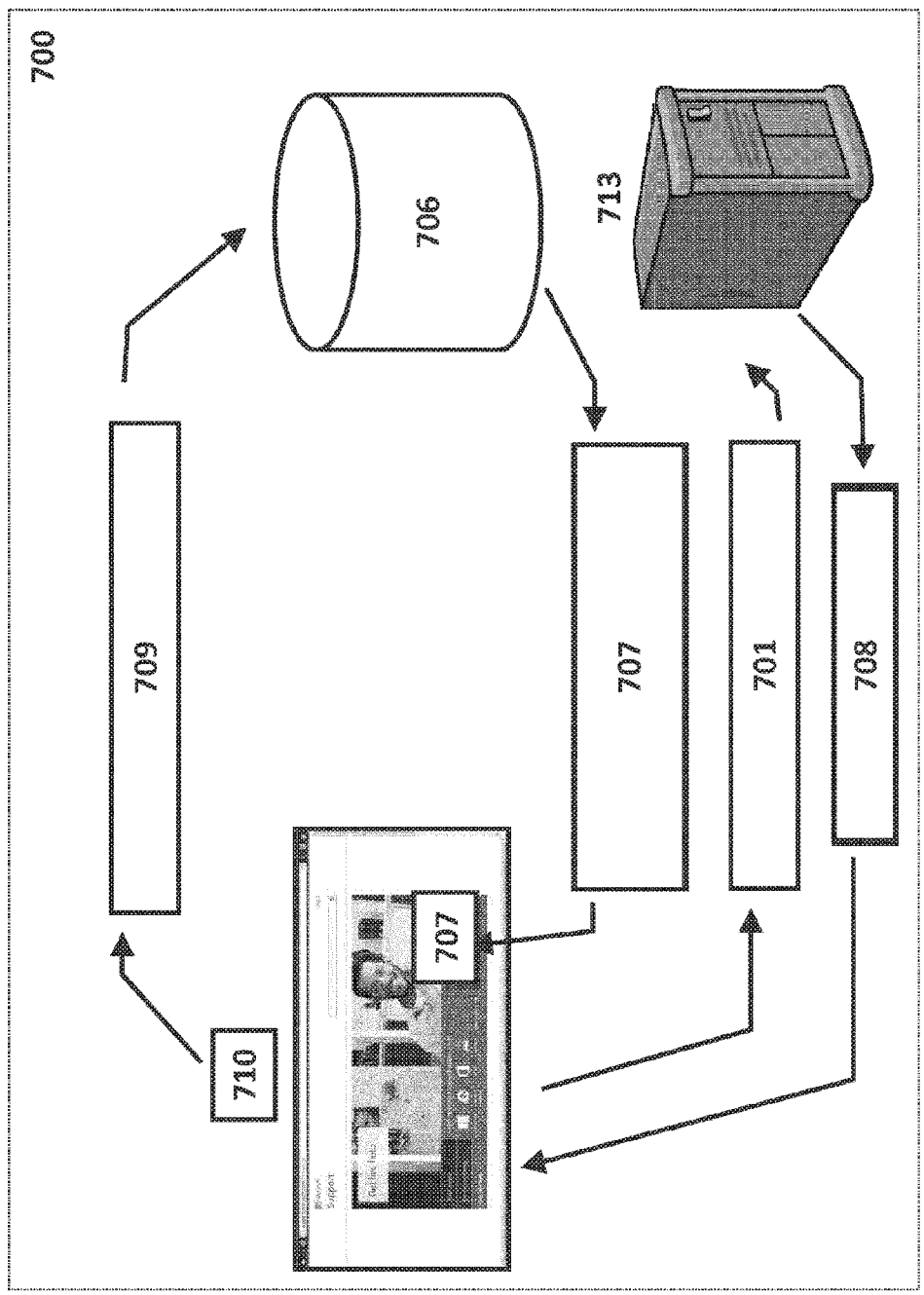
FIG. 7 shows an example of the deployment of the Service Connector Agent in a web application in accordance with a preferred embodiment of the present invention.

In preferred implementations of the present invention, the Service Connector Agent 107 of FIG. 1 may be deployed in a similar way to that of the Client Connector Agent 105. This is described below and illustrated in FIGS. 6 and 7 which respectively show deployment within a mobile device and in a web application. As shown in FIG. 6, the Service Administrator 604 communicates Service Connector Agent Descriptor Handles 609 to actual Service Agents 602 by unspecified means, e.g. email, SMS, URL, QR-Code, location information, etc. A Service Agent 602 imports 603 the received handle 609 in the Service Connector Agent Container 610, 710, i.e. the "Service Agent Button" Container, e.g. in a browser application 710 or a mobile device application 610. Once imported, the Service Connector Agent Descriptor Handle 609 is then activated 605, 709 by the software application establishing a communication link 605 with the Service Connector Repository 606, 706 which sends the Service Connector Agent 607, 707 to the computing device. The software application 610, 710 installed on the device then installs the Service Connector Agent 707 in the Service Container installed on the device 610, 710. The Service Agent can then be activated in order to sign in 601, 701 with the Signaling Server 613, 713 by, for example clicking on the "Service Agent Button" 607, 707 to signal availability 608, 708 to accept the establishment of communication links with Clients, i.e. from (contact initiator user(s)).

Server & Client Architecture

Figure 8:
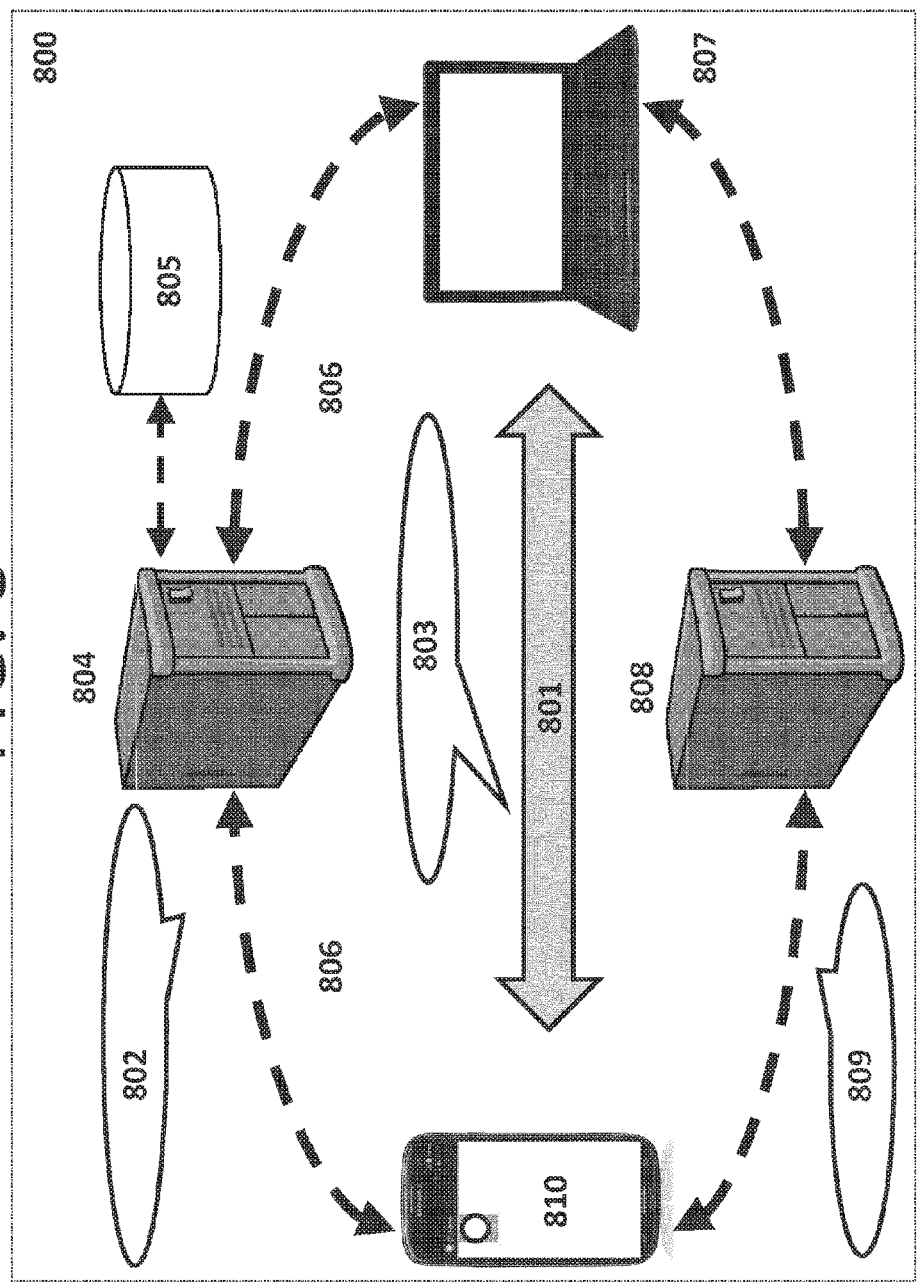
FIG. 8 shows an example of a server/client architecture that may be used to implement the present invention.

FIG. 8 shows an example of a server/client architecture that may be used to implement the present invention. A software application native to a mobile device 810 receives and sends signaling, presence and messaging data 802 to a Signaling Server e.g. OpenFire (XMPP) via secure WebSockets 806. The Signaling Server communicates with a database 805 such as a PostgreSQL system which forms the basis of the Service Connector Repository. The mobile device application 810 also communicates with a server 808 for Network Address Translation (NAT) which implements protocols such as Session Traversal Utilities for NAT (STUN) or Traversal Using Relays Around NAT (TURN) and Interactive Connectivity Establishment (ICE). The mobile device applications server communicates with this server over a secure WebSocket using a Firewall 809. The Signaling Server 804 also communicates over secure WebSockets 806 to a further computing device 807, in this case the device includes a HTML5-enabled browser with a web application installed therein. Once the communication link 801 is established according to the invention as described above, the link may comprise a multimedia data stream 803 using the WebRTC protocol.

Generation of a Service Proxy Button 900 and Connection Establishment 1000

FIG. 9 shows an example of a service proxy button being generated according to the present invention. Service Connector Descriptors 903 from a set of service agents (contact recipient users 902) 907 are input into a Service Connectors Factory 905, which generates corresponding Service Connector Handles 904 i.e. tokens. These Handles may be associated with a Broker or Switchboard Agent 906 and may be distributed to a client (contact initiator user 901) and installed into a software application native to their computing device as a Service Proxy Button 908. FIG. 10 shows an example of a peer-to-peer communication link being established according to the present invention. By the Client user 901, 1001 pressing the button 908, 1008, the instructions programmed within the token enable a communication link to be established between the Client 901, 1001 and a team of Service Agents 907 or single Service Agent 1007 as contact recipient users 902, 1002 over a data communications network 1004 via a chain of Switchboard Agents 906, 1006.

Examples of Preferred Methods of Use

In a first example, a contact recipient user can register online to the Signaling Server of a website offering such communication services as video calling with some form of identification such as an e-mail address. The Signaling Server of the website in this example returns a (software) "token" to the user, the token comprising an identifier, for example, in the form of a globally unique embedded ID, in response to the registration. The globally unique ID embedded in the token is preferably a universally unique identifier (UUID) that effectively allows the Signaling Server to refer to the specific user later on. This token may be considered as a "handle" as referred to in other parts of the description.

The contact recipient user can associate various contextual information with the token, for example, some character strings and an image file (e.g. their first name, last name and picture), in order to effectively create a profile which may be recognized by other users. The contact recipient user may then distribute the token to other users such as their peers in the form of e-mail content (e.g. a text paragraph) or a file attachment (e.g. an encrypted binary file). It will be understood to the skilled person that many other means of propagation of this token are possible such as SMS, QR code, URLs. Once received by another user, the token is imported into a generic software application installed on e.g. a mobile device or as a web application on a browser. This results in "registering" the user receiving the token with the Signaling Server as one of the contact recipient user's "friends" that can subsequently call them. As discussed above, various authentication means may also be implemented in order to ensure that only the users to which the token was distributed are able to activate it. The user in receipt of the token can organize received tokens into groups and customize each of them (associate a nickname, change the image, etc.), for ease of recovery and usage. Upon activation of the token by the user in receipt of the token (i.e. thereby becoming a contact initiator user) within the software application or web application within the browser installed on their computing device, the application or browser establishes a communication link such as a video or audio call with the contact recipient user who originally generated and distributed the token, the communication link being direct via various communication protocols, preferably including the WebRTC protocol.

A further example of an implementation of the present invention involves a user obtaining a handle relevant to a service or product, for example, by browsing a website and finding a URL or by scanning a QR code on the back of the product packaging using a mobile device such as a smart phone. The handle may then be activated by clicking on the URL or automatically upon scanning a QR-code. By activating the handle a communication link to a database such as the Service Connector Repository is established. The database subsequently issues a Client Connector Agent and a "button" may be installed within the user's web browser or within a software application installed on the mobile device. The installed button provides the means to activate the Client Connector Agent which enables a peer-to-peer connection to be established with a Service Agent related to the website or product of interest respectively. A Service Agent uses a similar system to log-in and indicate his availability to Broker Connector Agents and by doing so their availability for receiving communication from other users. In this example, the user can advantageously initiate a multimedia peer-to-peer communication link with an anonymous Service Agent, whilst maintaining their own anonymity and hence privacy.

The aforementioned examples are for illustration purposes only and the skilled person will recognize that a large number of possible cases of use of the present invention exist which also fall within the scope of the appended claims. For example, the method, system or computer-implemented instructions of the present invention may also be integrated within a company infrastructure to provide a convenient system for internal video conferencing which is compatible with both standard web browsers and mobile devices enabling employees to establish a multimedia communication link at the office or whilst on the road. Furthermore, the present invention may also be implemented as a custom video call service on a website using means readily available to both users i.e. standard web browsers and mobile devices. This service improves personalized relationships between visitors and members, optimized sales process and enhanced training, assistance and support.

Other examples include but are not limited to integrating video communications within network games to allow team players to discuss their strategy, within a document (e.g. a contract) for discussions with the editors (e.g., lawyers), or within any business logic process where live interactions may improve the process or results.

The invention claimed is:

1. A method for establishing a peer-to-peer communication link over a data communications network comprising:
generating a token comprising an identifier associated with at least one first user, wherein the token further comprises instructions which, when executed, determine how the peer-to-peer communication link is established;
distributing the token to at least one second computing device associated with at least one second user;
importing the token into a software application installed on the at least one second computing device;
selectively reprogramming the instructions of the imported token by the software application based on local data available to the software application to change elements of the peer-to-peer communication link, wherein the local data available to the software application comprises at least one of: data specific to the at least one second computing device, and data associated with a location of the at least one second computing device; and
activating the imported token to cause the instructions to be executed by the at least one second computing device, thereby to establish the peer-to-peer communication link to at least one first computing device associated with the at least one first user, whereby the at least one first user and the at least one second user are enabled to communicate with one another via said peer-to-peer communication link,
wherein the instructions cause the association between the at least one first computing device and the at least one first user to be changed dynamically before establishing the peer-to-peer communication link and/or during the peer-to-peer communication via the communication link.

2. The method of claim 1, wherein the instructions of the token determine how the peer-to-peer communication link is routed.

3. The method of claim 1, wherein the instructions cause the peer-to-peer communication link to be established differently dependent on the method of distribution of the token.

4. The method of claim 1, wherein the instructions of the token cause the possibility to establish the peer-to-peer communication link between the at least one second user and the at least one first user to be limited.

5. The method of claim 1, wherein establishing the peer-to-peer communication link between the at least one first computing device and the at least one second computing device comprises establishing the peer-to-peer communication link via at least one programmable agent, wherein the at least one programmable agent comprises further instructions which determine how the peer-to-peer communication link is routed.

6. The method of claim 5, wherein said further instructions are reprogrammed by the instructions of the token.

7. The method of claim 1, further comprising authenticating the at least one second user by authentication means.

8. The method of claim 1, wherein one of the computing devices is a mobile device and the other computing device is a personal computer; and/or
wherein the peer-to-peer communication link is established using at least one communication protocol including the WebRTC protocol; and/or,
wherein the peer-to-peer communication link is a multimedia communication link.

9. A non-transitory computer readable storage medium comprising program instructions for causing a computer to perform a method for establishing a peer-to-peer communication link over a data communications network, the method comprising:
generating a token comprising an identifier associated with at least one first user, wherein the token further comprises instructions which, when executed:
determine how the peer-to-peer communication link is established;
allow the token to be imported into a software application installed on at least one second computing device;
allow the instructions of the imported token to be reprogrammed by the software application based on local data available to the software application to change elements of the peer-to-peer communication link, wherein the local data available to the software application comprises at least one of: data specific to the at least one second computing device, and data associated with a location of the at least one second computing device; and
allow the imported token to be activated to cause the instructions to be executed by the at least one second computing device, thereby to establish the peer-to-peer communication link to at least one first computing device associated with the at least one first user, whereby the at least one first user and the at least one second user are enabled to communicate with one another via said peer-to-peer communication link,
wherein the instructions cause the association between the at least one first computing device and the at least one first user to be changed dynamically before establishing the peer-to-peer communication link and/or during the peer-to-peer communication via the communication link.

* * * * *